United States Patent Office 3,327,019
Patented June 20, 1967

3,327,019
DIETHERS AND COPOLYMERIZATES THEREFROM
Helmut Mylenbusch and Heinrich Krimm, Krefeld-Bockum, and Herman Schnell, Krefeld-Urdingen, Germany, assignors to Farbenfabriken Bayer Aktiengesellschaft, Leverkusen, Germany, a corporation of Germany
No Drawing. Filed Feb. 1, 1966, Ser. No. 523,956
Claims priority, application Germany, Nov. 24, 1960, F 32,612; Apr. 19, 1961, F 33,705; Dec. 16, 1961, F 35,574; Feb. 6, 1962, F 35,943
9 Claims. (Cl. 260—861)

This application is a continuation-in-part of applications Ser. No. 154,021 filed Nov. 21, 1961, Ser. No. 243,666 filed Dec. 10, 1962 and Ser. No. 255,108 filed Jan. 30, 1963, each of the aforesaid applications being now abandoned.

The present invention is concerned with new diethers and copolymerizates therefrom. The reaction scheme utilized to produce these novel diethers and copolymerizates can be illustrated as follows:

I. R—OH+ClCH$_2$—CH——CH$_2$ → R—O—CH$_2$—CH——CH$_2$
  \O/       \O/ production of glycidyl ether

II.
                                OH
R—OCH$_2$—CH——CH$_2$ + R$_1$OH→R—O—CH$_2$—CH—CH$_2$—O—R$_1$
   \O/ production of novel diether

III.
      OH
       |                  copolymerizable
R—O—CH$_2$—CH—CH$_2$—O—R + compound ——→ copolymerizate production of novel copolymerizate The definitions of R and R$_1$ above are explained in detail below.

The new diethers of the present invention are represented by the general formula:

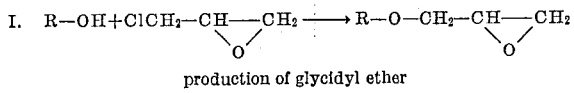

wherein R$_1$, R$_2$ and R$_3$ are the same or different and signify hydrogen or alkyl having up to 4 carbon atoms, cycloalkyl or phenyl, R$_4$ and R$_5$ which may also be the same or different, signify hydrogen atoms or methyl, R$_6$ signifies a radical with $n$ substitutable positions on aromatic nuclei, and $n$ is a whole number greater than zero. The novel diethers according to the present invention are identified as 2-hydroxy-1-(p-vinylphenyl)-3-arylpropylene diethers. The new diethers may be obtained by reacting at least $n$ mols of a p-vinylphenylglycidyl ether of the general formula:

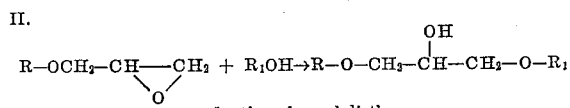

wherein R$_1$, R$_2$, R$_3$, R$_4$ and R$_5$ have the same meanings as above, with one mol of an appropriate n-basic aromatic hydroxyl compound, optionally in the presence of inert organic solvents and catalysts.

Surprisingly, the vinyl group of the p-vinylphenylglycidyl ether is not thereby affected, although it is known that phenols, namely in the presence of acidic or basic catalysts, readily react with aliphatic double bonds, for example, with the formation of alkylated phenols or of phenol ethers.

As examples of p-vinylphenyl-glycidyl ethers which may be used to produce the novel diethers of the present invention, there may be mentioned the ethers of p-vinylphenol,
p-(2-methyl-vinyl)-phenol,
p-(2-ethyl-vinyl)-phenol,
p-(2,2-dimethyl-vinyl)-phenol,
p-(2-propyl-vinyl)-phenol,
p-(2-isopropyl-vinyl)-phenol,
p-(2-butyl-vinyl)-phenol,
p-(2-methyl-2-propyl-vinyl)-phenol,
p-(2-methyl-2-isopropyl-vinyl)-phenol,
p-(2,2-diethyl-vinyl)-phenol,
p-(2-ethyl-2-isopropyl-vinyl)-phenol,
p-(1-methyl-vinyl)-phenol (p-isopropenylphenol),
p-(2-methyl-1-methyl-vinyl)-phenol (p-isobutenyl-phenol),
p-(2-ethyl-1-methyl-vinyl)-phenol,
p-(2,2-dimethyl-1-methyl-vinyl)-phenol,
p-(2-propyl-1-methyl-vinyl)-phenol,
p-(2-isopropyl-1-methyl-vinyl)-phenol,
p-(2-methyl-2-ethyl-1-methyl-vinyl)-phenol,
p-(1-methyl-vinyl)-phenol,
p-(2-methyl-1-ethyl-vinyl)-phenol,
p-(2-ethyl-1-ethyl-vinyl)-phenol,
p-(2-propyl-1-ethyl-vinyl)-phenol,
p-(2-isopropyl-1-ethyl-vinyl)-phenol,
p-(1-propyl-vinyl)-phenol,
p-(2-methyl-1-propyl-vinyl)-phenol,
p-(2-ethyl-1-propyl-vinyl)-phenol,
p-(1-isopropyl-vinyl)-phenol,
p-(1-butyl-vinyl)-phenol,
p-(1,2-tetramethylene-vinyl)-phenol,
p-(1-cyclohexyl-vinyl)-phenol,
p-(1-phenyl-vinyl)-phenol,
p-(1-methyl-vinyl)-o-cresol, and so on.

In order to produce the glycidyl ethers useful as starting materials one may use the known reaction of phenols with epihalohydrins in the presence of tertiary amines to give the corresponding halohydrin-phenyl ethers and the splitting of hydrogen halide therefrom with alkali to form phenyl glycidyl ethers. Alternatively one may use the reaction of phenols with epihalohydrins or dihalohydrins in the presence of alkalis to give directly the corresponding phenylglycidyl ethers. Any one of the following equations:

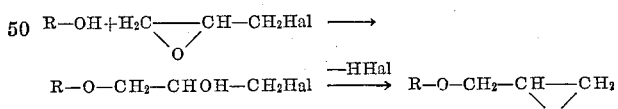

or

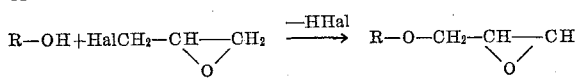

or

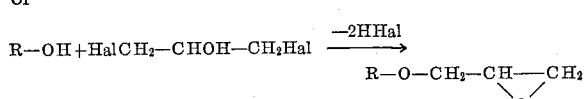

or

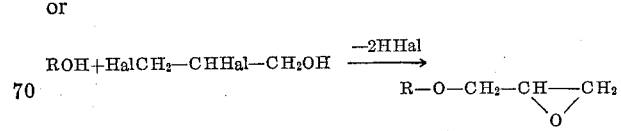

may be used wherein ROH stands for a p-vinylphenol of the general formula:

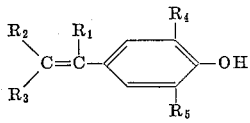

wherein $R_1$, $R_2$, $R_3$, $R_4$ and $R_5$ are as defined above. By the use of these reactions therefore the p-vinylphenyl-glycidyl ethers used as starting materials for the diethers of the present invention can be obtained.

As is known from the reaction of vinyl group-free phenols with epihalohydrins or dihalohydrins, the p-vinylphenols can, according to the invention, also be reacted to produce the p-vinylphenyl glycidyl ether in different ways.

Thus, for example, a catalytic amount of a tertiary amine can be added to a solution of a p-vinylphenol in excess epihalohydrin, the solution, starting at room temperature, slowly heated and then the equivalent amount of aqueous alkali added at temperatures between about 20 and 100° C.

Another form of the process consists in adding dropwise, at temperatures between about 20 and about 40° C., excess epihalohydrin or dihalohydrin to the solution of the p-vinylphenol in aqueous alkali. Furthermore, a cold solution of a p-vinylphenol in epihalohydrin or dihalohydrin can be added to an aqueous alkali solution at about 70–100° C. or, on the one hand, such a solution and, on the other hand, an aqueous alkali solution can be introduced gradually and simultaneously into a reaction vessel heated to about 70–100° C.

If desired, it is also possible to deviate from the above-mentioned temperatures. In general, however, suitable reaction temperatures lie in the region between about 0 and about 100° C., and particularly between 20 and 80° C.

As vinylphenols used to produce the p-vinylphenyl-glycidyl ethers, the following vinylphenols may, for example, be mentioned:

p-vinylphenol,
p-(2-methyl-vinyl)-phenol,
p-(2-ethyl-vinyl)-phenol,
p-(2,2-dimethyl-vinyl)-phenol,
p-(2-propyl-vinyl)-phenol,
p-(2-isopropyl-vinyl)-phenol,
p-(2-butyl-vinyl)-phenol,
p-(2-methyl-2-propyl-vinyl)-phenol,
p-(2-methyl-2-isopropyl-vinyl)-phenol,
p-(2,2-diethyl-vinyl)-phenol,
p-(2-ethyl-2-isopropyl-vinyl)-phenol,
p-(1-methyl-vinyl)-phenol (p-isopropenyl-phenol),
p-(2-methyl-1-methyl-vinyl)-phenol (p-isobutenylphenol),
p-(2-ethyl-1-methyl-vinyl)-phenol,
p-(2,2-dimethyl-1-methyl-vinyl)-phenol,
p-(2-propyl-1-methyl-vinyl)-phenol,
p-(2-isopropyl-1-methyl-vinyl)-phenol,
p-(2-methyl-2-ethyl-1-methyl-vinyl)-phenol,
p-(1-ethyl-vinyl)-phenol,
p-(2-methyl-1-ethyl-vinyl)-phenol,
p-(2-ethyl-1-ethyl-vinyl)-phenol,
p-(2-propyl-1-ethyl-vinyl)-phenol,
p-(2-isopropyl-1-ethyl-vinyl)-phenol,
p-(1-propyl-vinyl)-phenol,
p-(2-methyl-1-propyl-vinyl)-phenol,
p-(2-ethyl-1-propyl-vinyl)-phenol,
p-(1-isopropyl-vinyl)-phenol,
p-(1,2-tetramethylene-vinyl)-phenol,
p-(1-phenyl-vinyl)-phenol and
p-(1-methyl-vinyl)-o-cresol etc.

The p-vinylphenols, especially the particularly valuable p-isopropenyl phenol, are obtainable, for example, by catalytic fission of the corresponding dihydroxy-diaryl alkanes, particularly with the use of alkaline materials as fission catalysts according to the process of the U.S. specification Ser. No. 44,848.

As epihalohydrins or dihalohydrins, the chlorine and bromine products can be used with advantage. As tertiary amines which can, if desired, be used for the process, there may be mentioned by way of example, triethylamine, dimethyl- and diethylaniline, dimethyl- and diethylcyclohexylamine, triphenylamine and pyridine.

Aromatic mono- and polyhydroxyl compounds which can be reacted with the p-vinylphenyl-glycidyl ethers according to the invention are, for example, phenol, alkylphenols, such as the cresols, the xylenols, mono- and polyethylphenols, mono- and polypropylphenols and so on, cycloalkylphenols, such as cyclohexylphenols, halophenols, such as mono- and polychloro, bromo and idophenols, nitrophenols, dihydroxybenzenes, such as hydroquinone and resorcinol, dihydroxydiphenyl, dihydroxydiphenyl-alkanes, -cycloalkanes, ethers, sulphides, sulphoxides and sulphones of the bis-(4-hydroxyphenyl) methane type or of the 2,2-bis(4-hydroxyphenyl) propane type, as well as $\alpha,\alpha'$-di-(4-hydroxyphenyl)-$\alpha,\alpha,\alpha',\alpha'$-tetramethyl-p-xylene, the triphenol of the formula:

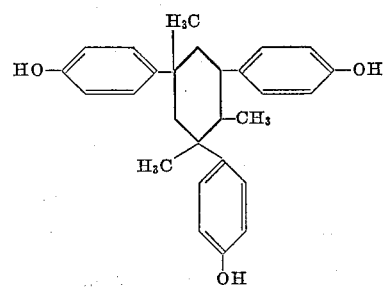

which is obtainable by the treatment of p-isopropenylphenol with acidic catalysts, 1-p-hydroxyphenyl-3,3-di-p-hydroxyphenyl-propane and 1,1,2,2-tetra-(p-hydroxyphenol)-ethane.

$R_6$ can represent the residue of an aromatic hydroxy compound which is a mixed polymerizate of p-isopropenyl phenol with other polymerizable vinyl compounds, such as are obtainable by the reaction of p-vinylphenols with vinyl monomers, such as styrene, in the presence of Lewis acids. Also condensation products from phenols and aldehydes of the novolak type or resols can be used. In such cases the number of hydroxy groups will depend on the number of repeating polymer units.

The addition of the aromatic mono- and polyhydroxy compounds to the p-vinylphenyl-glycidyl ethers can according to the invention take place not only in the melt of the reaction components but also in an inert solvent, such as chlorobenzene, toluene, xylene, ethyl-benzene, decahydronaphthalene, anisol, diethyl carbonate or pyridine, at temperatures between about 50 and about 250° C.

For the acceleration of the reaction, there can be added, if desired, catalysts, such as alkali metal hydroxides, alkali metal acetates, alkali metal stearates, alkali metal oleates and alkali metal phenolates, as well as tertiary amines, such as pyridine, triethylamine, dimethylcyclohexylamine and dimethylaniline, and also triphenyl phosphine, preferably in amounts of about 0.001 to about 10%.

In order to obtain the products in as colorless a form as possible, it is advisable to work in inert atmospheres, such as atmospheres of nitrogen, hydrogen or carbon dioxide.

For the quantitative etherification of the phenolic hydroxyl groups, it is expedient to add an excess of the glycidyl ether which, if desired, can again be removed from the reaction product by distillation.

Instead of using an excess of glycidyl ether, it is, however, also possible, if desired, to etherify free phenolic hydroxyl groups still present in the end product by the addition of simple epoxides, such as ethylene oxide, propylene oxide and styrene oxide. The content of free phenolic hydroxyl groups in the addition products can be determined chromatographically or by color reactions.

On the basis of the reactive aliphatic hydroxyl groups which may be present several times in the new ethers, as well as on the double bonds, these products are intermediates of wide applicability, for example, for the production of plasticizers and of polymerizable esters and polyesters by methods known in the art per se.

The new copolymerizates of the present invention may be obtained by copolymerizing the 2-hydroxy-1-(p-vinylphenyl)-3-arylpropylene diethers with polymerizable compounds.

Examples of polymerizable compounds for copolymerization with the 2-hydroxy-1-(p-vinylphenyl)-3-arylpropylene diethers include vinyl compounds, such as styrene, α-methyl-styrene, chloro-styrenes, acrylic and methacrylic acid nitrile, acrylic and methacrylic acid esters, acrylic and methacrylic acid amide, methyl vinyl ketone, methyl vinyl ether, vinyl acetate, maleic acid and fumaric acid derivatives, such as maleic anhydride or esters of maleic —or fumaric acid, as well as unsaturated polyesters which contain, as main components, maleic acid or fumaric acid esters. Mixtures of several such polymerizable compounds may also be used as multiple component systems for copolymerization with the 2-hydroxy-1-(p-vinyl-phenyl)-3-aryl-propylene diethers.

The mixture ratio of the components can, in most cases, be varied within wide limits. It can, if desired, amount to, for example, from about 1 to about 99 parts by weight propylene diether to about 99 to about 1 parts by weight of the other polymerizable compounds.

Surprisingly, still small additions of the 2-hydroxy-1-(p-vinylphenyl)-3-aryl-propylene diethers to the polymerizable compounds of the type mentioned are sufficient advantageously to influence the properties of the polymerizates. This is particularly noticeable in the case of multiple unsaturated 2-hydroxy-1-(p-vinylphenyl) - 3 - arylpropylene diethers which leads to cross linkage products. Even additions of 5 to 10% of a 2-hydroxy-1-(p-vinylphenyl)-3-aryl-propylene diether to a vinyl monomer, such as styrene, leads to the hardening of insoluble and non-meltable formed bodies which possess outstanding mechanical and electrical properties, as well as high heat stability and which are completely insensitive to heat, water, acids or alkalis, even upon storage for several weeks at high temperatures.

The polymerization can be initiated by heat, irradiation or radical-forming polymerization catalysts.

Radical-forming polymerization catalysts are, for example, diacetyl peroxide, dibenzoyl peroxide, lauroyl peroxide, tertiary-butyl peroxide, methyl ethyl ketone hydroperoxide, cyclohexanone hydroperoxide, tertiary butyl hydroperoxide, tertiary butyl peracetate, tertiary-butyl perbenzoate, ditertiary-butyl diperphthalate, peracetic acid, hydrogen peroxide, potassium and ammonium sulfate and azo diiso-butyronitrile.

Cold hardening catalyst systems, such as cobalt II salts/hydroperoxides and tertiary amines/diacyl peroxides, are also useful catalysts. Furthermore, heat, light and energy-rich rays are effective polymerization initiators. Finally, the polymerization can also be carried out according to the anionic or cationic mechanism with corresponding catalysts, in known manner.

The polymerization technique to be chosen in any particular case depends, in the first place, on the nature of the copolymerizates to be produced and on the properties of the reaction components. If the starting materials and the end products are soluble, as is the case with simple unsaturated 2 - hydroxy-1-(p-vinylphenyl)-3-aryl-propylene diethers, there can be used, apart from mass polymerization, also solution, dispersion or emulsion polymerization. If the copolymerizates are insoluble and non-meltable, as is the case with multiple unsaturated 2-hydroxy-1-(p-vinylphenyl)-3-aryl-propylene diethers, it is advantageous to use mass polymerization.

The properties of the new copolymerizates depend, of course, to a large extent upon the nature and composition of the components. Since these can be varied within the wide limits there is available by the present invention, a considerable breadth of variation of interesting synthetic resins. The new copolymerizates are synthetic resins or, in so far as they are soluble, also intermediate products for the production and modification of synthetic resins, and lacquer raw materials.

If desired, strengthening and filling agents, such as quartz powder, glass fibres, glass woven fabrics, wool and mats, asbestos and metal powder, as well as textiles can be worked in, as well as pigments, dyestuffs and plasticizers.

The exceptional adherence of the hardened resins to glass, metals, wood and other materials is particularly noteworthy. This property proves to be particularly valuable in the case of the incorporation of fillers and strengthening materials.

The following examples are given for the purpose of illustration only and are not to be construed as express or implied limitations.

PRODUCTION OF GLYCIDYL ETHER

Example 1

A solution of 134 grams (1 mol) p-isopropenylphenol in 277 grams (3 mol) epichlorohydrin, to which 10 grams (0.1 mol) triethylamine are added, is slowly heated to 100° C. with stirring and maintained for ½ hour at this temperature. 200 millilitres (1 mol) 5 N sodium hydroxide solution is then added dropwise during the course of 1 hour. The mixture is further stirred for 1 hour at 90° C. The 2 layers are then separated in a separating funnel. The organic phase is washed once with 2 N sodium hydroxide solution and then washed with water until neutral. The excess epichlorohydrin is first removed from the dry solution at water pump vacuum and the residue then distilled over a short column. Yield of p-isopropenylphenyl glycidyl ether 158 grams (83 percent of the theory). B.P. 107–110° C./0.1 mm. Hg., M.P. 44–45° C.

Example 2

A solution of 134 grams (1 mol) p-isopropenyl phenol in 185 grams (2 mol) epichlorohydrin to which 10 grams (0.1 mol) triethylamine are added, is slowly heated to 90° C. and maintained at this temperature for 1 hour. The reaction mixture is then cooled to 40° C. At this temperature, 210 millilitres (1.05 mol) 5 N sodium hydroxide solution are slowly added dropwise, with stirring. The mixture is further stirred for 2 hours at 40° C. The working up takes place as described in Example 1. Yield: 167 grams (88 percent of the theory).

Example 3

A solution of 134 grams (1 mol) p-isopropenyl phenol in 200 millilitres (1 mol) 5 N sodium hydroxide solution is added dropwise, with stirring, at room temperature during the course of 1 hour to 450 grams (5 mol) epichlorohydrin. The mixture is further stirred for 10 hours at room temperature. Working up takes place as described in Example 1. Yield: 158 grams (78 percent of the theory).

Example 4

A solution of 134 grams (1 mol) p-isopropenyl phenol in 200 millilitres (1 mol) 5 N sodium hydroxide solution is added dropwise, with stirring, to 277 grams (3 mol) epichlorohydrin previously heated to 90° C. Stirring is carried out for a further two hours at 90° C. Working up takes place as described in Example 1. Yield: 139 grams (73 percent of the theory).

Example 5

A solution of 67 grams (0.5 mol) p-isopropenyl phenol in 200 millilitres (1 mol) 5 N sodium hydroxide solution is added dropwise, with stirring, at 70° C. to a solution of 67 grams (0.5 mol) p-isopropenyl phenol in 277 grams (3 mol) epichlorohydrin. The mixture is further stirred for two hours at 90° C. Working up takes place as described in Example 1. Yield: 144 grams (76 percent of the theory).

*Example 6*

220 millilitres (1.1 mol) 5 N sodium hydroxide solution is added dropwise, with stirring, at 40° C. to a solution of 148 grams (1 mol) p-isobutenylphenol in 277 grams (3 mol) epichlorohydrin. The mixture is further stirred for 2 hours at 40° C. Working up takes place as described in Example 1. Yield of p-isobutenylphenylglycidyl ether: 178 grams (87 percent of the theory). B.P. 122–125° C./0.2 mm. Hg.

*Example 7*

174 grams (1 mol) p-cyclohexenyl phenol in 460 grams (5 mol) epichlorohydrin with the addition of 1 gram triphenyl phosphine are slowly heated to 80° C., with stirring, and maintained at this temperature for 1 hour, 1.1 mol of a 40 percent sodium hydroxide solution are added dropwise at 55–60° C. during the course of ½ hour. The reaction mixture is stirred for a further ½ hour at this temperature. The layers are subsequently separated, the organic phase washed once with water and excess epichlorohydrin distilled off under water pump vacuum. The residue is fractionated at oil pump vacuum. Yield: 89 percent of the theory of p-cyclohexenyl phenyl-glycidyl ether; B.P. 163–165° C./0.2 mm. Hg.

*Example 8*

A solution of 196 grams (1 mol) p-(α-phenylvinyl)-phenol in 1.1 mol 15 percent sodium hydroxide solution is added dropwise in the course of 1 hour at 30–35° C. to 460 grams (5 mol) epichlorohydrin to which 1 gram triethylamine has been added. The reaction mixture is subsequently heated for ½ hour at 70° C. The layers are separated. The organic phase is washed once with water and excess epichlorohydrin distilled off under water pump vacuum. The residue is fractionated at oil pump vacuum. Yield: 87 percent of theory of p-(α-phenylvinyl)-phenylglycidyl ether; B.P. 160–162° C./0.05 mm. Hg.

PRODUCTION OF NOVEL DIETHER

*Example 1*

1 mol of 2,2-bis-(4-hydroxyphenyl)-propane is melted in a 1 liter flask, provided with a stirrer and an internal thermometer, with 2 mols of p-(1-methyl-vinyl)-phenyl glycidyl ether (p-isopropenylphenyl glycidyl ether) with the addition of 0.1% of lithium bisphenolate in an atmosphere of nitrogen and slowly heated, with stirring to 130–140° C. An exothermic addition reaction commences in this temperature range. By suitable cooling, the temperature is maintained between 150 and 160° C. After subsidence of the reaction, the mixture is further stirred for 1 hour at 155° C. There is obtained a pale yellow colored resin which is hard at room temperature, which softens at 100–110° C. and is readily soluble in most organic solvents.

Molecular weight determination: 590–600 (theoretically 608). The product corresponds to the following formula:

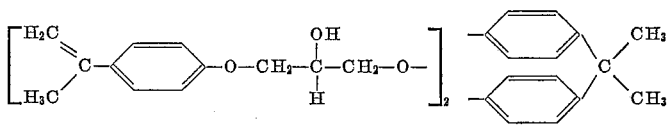

*Example 2*

1 mol of 1,1-di-(4-hydroxyphenyl)-cyclohexane is heated, with stirring, to a temperature of 120–130° C., in an atmosphere of hydrogen, with 2.05 mols of p-(1-ethyl-vinyl)-phenyl glycidyl ether with the addition of 0.1% dimethylcyclohexylamine. The mixture is maintained for 1 hour at 140–150° C. and then cooled. There is obtained a yellow colored resin which softens at 115–125° C. and is readily soluble in most organic solvents. Content of phenolic hydroxyl groups: 0.02%. The product corresponds to the following formula:

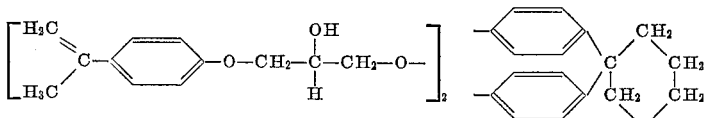

*Example 3*

1 mol of 2,6,2′,6′-tetrachloro-2,2-di-(4-hydroxy-phenyl)-propane is dissolved in 1 liter xylene with 2.1 mols of p-(1-phenylvinyl)-phenyl glycidyl ether, with the addition of 0.05% sodium hydroxide, and heated to boiling under reflux for 3 hours. There is obtained the yellow-colored solution of the addition product which is freed from solvent at water pump vacuum. There remains behind a hard brittle resin which is reasonably soluble in high boiling organic solvents. It corresponds to the formula:

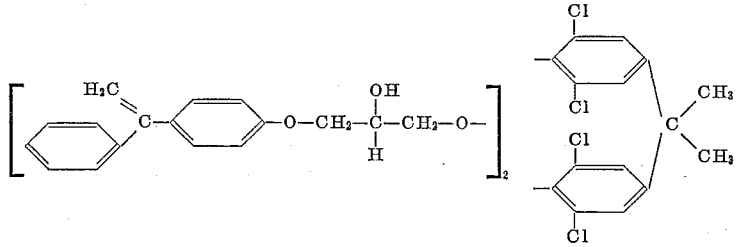

Example 4

1 mol of α,α′-di(4-hydroxyphenyl)-α,α,α′,α′-tetramethyl-p-xylene is heated in a nitrogen atmosphere, with stirring, to 130–170° C. with 3 mol p-isopropenyl phenylglycidyl ether and with the addition of 0.5% triphenylphosphine. An exothermic addition reaction hereby takes place. The mixture is subsequently stirred for 1 hour at 140° C., then the excess of p-isopropenylphenyl glycidyl ether is distilled off at oil pump vacuum. There remains behind a yellow, hard resin which softens at 100–110° C. and is readily soluble in most organic solvents. It corresponds to the following formula:

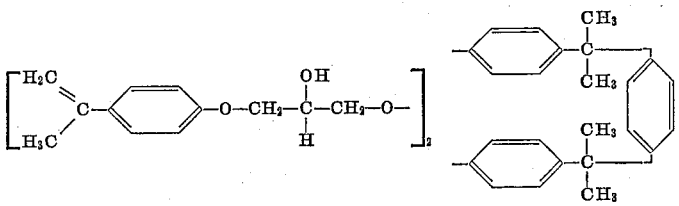

Example 5

1 mol of 4,4′-dihydroxydiphenyl sulphide is heated in an atmosphere of nitrogen, with stirring, at 120–125° C. with 2 mols of p-isopropenyl-phenyl glycidyl ether, with the addition of 0.2% of triphenyl phosphine. An exothermic addition reaction hereby takes place. The mixture is maintained for a further hour at 130–140° C. and then cooled. There is obtained an almost colorless crystalline product which melts at 90–100° C. and is readily soluble in most organic solvents. It corresponds to the following formula:

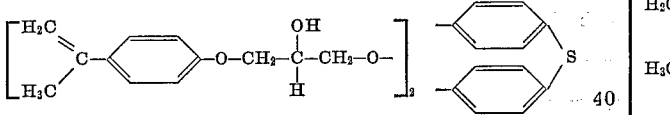

Example 6

1 mol of 4,4′-dihydroxydiphenyl sulphone is heated with 2 mols of p-isopropenyl-phenyl glycidyl ether, with the addition of 0.05% potassium hydroxide, in 1 liter toluene for 3 hours under reflux. There is obtained the almost colorless solution of the addition product, which is freed from solvent at water pump vacuum. There remains behind a product which crystallizes upon suitable treatment, which melts at 120–130° C. and is reasonably soluble in high boiling organic solvents. It corresponds to the following formula:

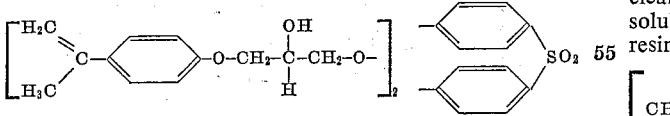

Example 7

1 mol of resorcinol is heated with 2 mols of p-isopropenylphenyl glycidyl ether at 105–110° C., with the addition of 0.1% of sodium hydroxide. The mixture is maintained for a further hour at 150° C. and then cooled. There is obtained a pale reddish-brown solid resin which softens at 90° C. and is soluble in organic solvents. It corresponds to the following formula:

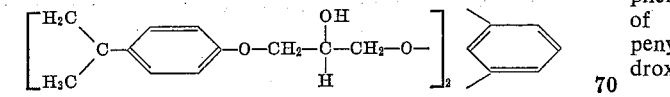

Example 8

1 mol of hydroquinone is heated in an atmosphere of hydrogen at 110–115° C. with 2 mols of p-isopropenylphenyl glycidyl ether, with the addition of 0.2% of sodium acetate. An exothermic reaction hereby takes place. The mixture is further stirred for 1 hour at 140–150° C. and then cooled. There is obtained a crystalline, grey-white product melts at 140–150° C. and is reasonably soluble in high boiling organic solvents. It corresponds to the following formula:

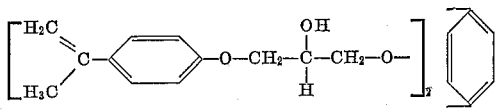

Example 9

95 grams of a mixed polymerizate from p-isopropenylphenol and styrene (hydroxyl number 112–116) are heated for 3 hours at 180–200° C. with 38 grams of p-isopropenylphenyl glycidyl ether, with the addition of 0.13 grams of sodium hydroxide. There is obtained a yellow colored hard resin which softens at 85° C. and is readily soluble in most organic solvents. It corresponds to the following formula:

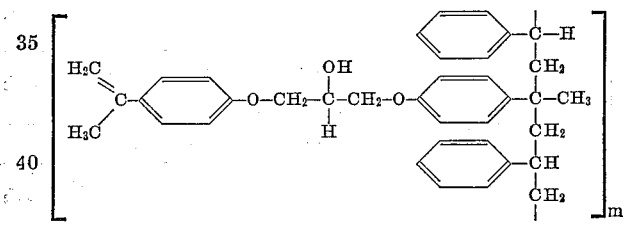

$m$ means a whole number greater than 1.

Example 10

180 grams of a novolak obtained by polycondensation of p-cresol and formaldehyde in a mol ratio of 8:7 in the presence of p-toluene sulphonic acid as catalyst (the hydroxy equivalent of said product is 120–125) are heated with 290 grams of p-isopropenylphenyl glycidyl ether with the addition of 0.5 gram of sodium hydroxide for 3 hours to 160–170° C. under nitrogen. One obtains a clear, hard resin which softens at 70° C. and which is soluble in polar organic solvents. The constitution of this resin may be rendered by the following formula:

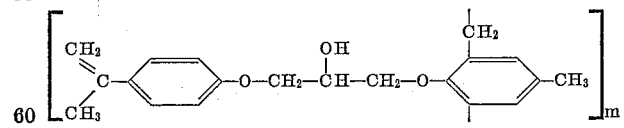

$m$ means a whole number greater than 1.

PRODUCTION OF NOVEL COPOLYMERIZATES

Example 1

A solution of 5 grams of a 2-hydroxy-1-(p-vinylphenyl)-3-aryl-propylene diether, produced from 2 mols of p-(1-methyl-vinyl)-phenylglycidyl ether (p-isopropenylphenylglycidyl ether) and 1 mol of 2,2-di-(4-hydroxyphenyl)-propane of the formula

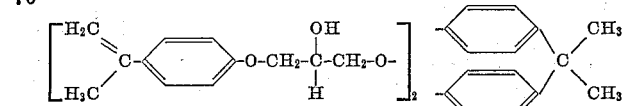

in 95 grams of styrene is mixed with 0.2 gram of methyl ethyl ketone hydroperoxide and heated to 90° C. between two glass plates rubbed with glycerol. After one hour, the solution has gelled and after a further four hours the hard mixed polymerizate is removed and tempered for a further five hours at 120° C. The copolymerizate is glass-clear, colorless, insoluble and non-meltable. It possesses outstanding mechanical and electrical properties. The heat stability according to Martens amounts to 87° C., the bonding strength according to Dynstat is 976 kg./cm.$^2$, the impact bond strength is 4.3 cm. kg./cm.$^2$ and the ball pressure hardness is 1415 kg./cm.$^2$.

Example 2

A solution of 25 grams of a 2-hydroxy-1-(p-vinyl-phenyl)-3-aryl-propylene diether, produced from 2 mols of p-isopropenyl-phenylglycidyl ether and 1 mol of 2,2-di-(4-hydroxyphenyl)-propane, in 75 grams of styrene is mixed with 0.7 gram of cumyl hydroperoxide and copolymerized as described in Example 1. The copolymerizate is glass-clear, almost colorless, insoluble and non-meltable. It possesses outstanding mechanical and electrical properties. The heat stability according to Martens amounts to 104° C., and the bonding strength according to Dynstat is 1035 kg./cm.$^2$.

Example 3

A solution of 50 grams of a 2-hydroxy-1-(p-vinyl-phenyl)-3-aryl-propylene diether, produced from 2 mols of p-isopropenylphenyl glycidyl ether and 1 mol of α,α'-di-(4-hydroxyphenyl)-α,α,α',α',-tetramethyl-p-xylene of the formula

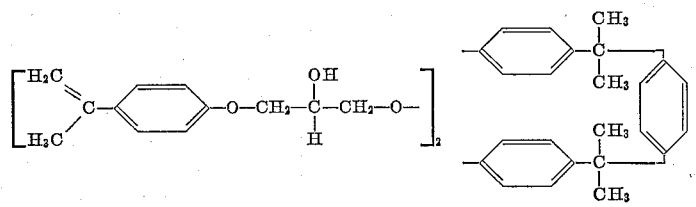

in 50 grams of styrene is copolymerized at 90° C., after the addition of 0.5 gram of cyclohexanone hydroperoxide. After fifteen hours, there is formed a hard, clear, insoluble and non-meltable copolymerizate.

Example 4

A solution of 80 grams of a 2-hydroxy-1-(p-vinyl-phenyl)-3-aryl-propylene diether, produced from p-isopropenylphenyl glycidyl ether and the equivalent amount of copolymerizate) phenolic hydroxyl number 112 to 116) from p-isopropenylphenol and styrene of the formula

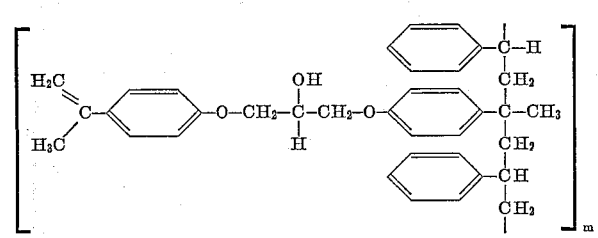

$m$ means a whole number greater than 1 in 20 grams of styrene is copolymerized at 90° C., with the addition of 0.8 gram of methyl ethyl ketone hydroperoxide. After 15 hours, there is formed a hard, clear, insoluble and non-meltable copolymerizate.

Example 5

A solution of 25 grams of a 2-hydroxy-1-(p-vinyl-phenyl)-3-aryl-propylene diether, produced from 1 mol of p-isopropenyl glycidyl ether and 1 mol of phenol of the formula

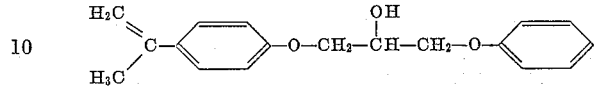

in 75 grams of styrene is copolymerized at 80° C., with the addition of 0.4 gram of methyl ethyl ketone hydroperoxide. After 15 hours there is obtained a hard, clear, insoluble and non-meltable copolymerizate.

Example 6

A solution of 3 grams of a 2-hydroxy-1-(p-vinyl-phenyl)-3-aryl-propylene diether, produced from 2 mols of p-(1-phenylvinyl)-phenylglycidyl ether and 1 mol of 4,4'-dihydroxydiphenyl sulfide of the formula

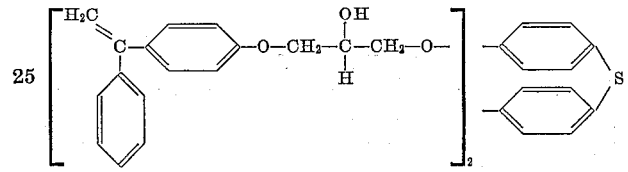

in 97 grams of acrylonitrile is copolymerized at 80° C. in a sealed ampoule, with the addition of 0.5 gram of dibenzoyl peroxide. After 15 hours, there is formed a clear, pale, yellowish, hard, insoluble and non-meltable copolymerizate.

Example 7

A solution of 10 grams of a 2-hydroxy-1-(p-vinyl-phenyl)-3-aryl-propylene diether, produced from 2 mols of p-(1-ethylvinyl)-phenylglycidyl ether and 1 mol of 1,1-di-(4-hydroxyphenyl)-cyclohexanene of the formula

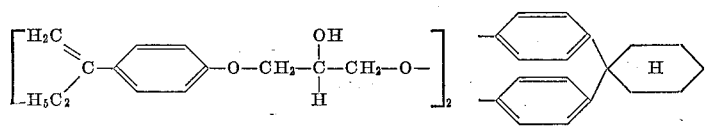

in 90 grams of methyl methacrylate is copolymerized at 80° C., with the addition of 0.5 gram of tertiary-butyl perbenzotate. After 15 hours, there is obtained a colorless, glass-clear, hard, insoluble and non-meltable copolymerizate.

Example 8

A solution of 10 grams of a 2-hydroxy-1-(p-vinyl-phenyl)-3-aryl-propylene diether, produced from 2 mols of p-isopropenyl-phenylglycidyl ether and 1 mol of 2,2-di-(4-hydroxyphenyl)-propane, and 30 grams of an unsaturated polyester which contains, as main groups, maleic or fumaric acid residues, in 60 grams of styrene, to which 1 gram of methyl ethyl ketone hydroperoxide and 2 grams of cobalt naphthalate are added, gells after standing for half an hour at room temperature. After a further 15 hours, there is obtained a clear, hard, insoluble and non-meltable copolymerizate.

*Example 9*

A solution of 60 grams of a 2-hydroxy-1-(p-vinylphenyl)-3-aryl-propylene diether, produced from 200 grams of a polyether (phenolic hydroxyl number 56) prepared from bis-phenol A and 2,2'-dichloro-diethyl ether and 38 grams of p-isopropenyl phenylglycidyl ether of the formula

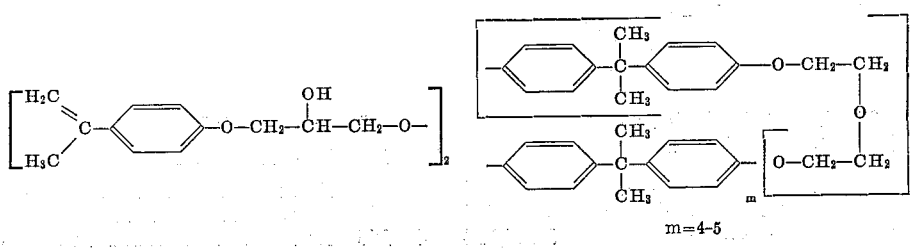

in 20 grams of styrene is copolymerized at 80° C., after the addition of 1 gram of dibenzoyl peroxide. After 15 hours, there is obtained a clear, colorless, hard, insoluble and non-meltable copolymerizate.

We claim:
1. A 2-hydroxy-1-(p-vinylphenyl)-3-aryl-propylene diether of the formula:

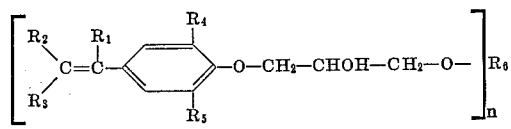

wherein $R_1$, $R_2$ and $R_3$ are substituents selected from the group consisting of hydrogen, alkyl with up to 4 carbon atoms, cyclo-alkyl and phenyl, $R_4$ and $R_5$ are substituents selected from the group consisting of hydrogen and methyl, $R_6$ is a radical with $n$ substitutable hydroxyl groups on aromatic nuclei, and $n$ is a whole number greater than 0.

2. Copolymerizates of the 2-hydroxy-1-(p-vinylphenyl)-3-aryl-propylene diether of claim 1 with ethylenically unsaturated compounds polymerizable across the double bond.

3. A process for the production of copolymerizates comprising polymerizing the 2-hydroxy-1-(p-vinylphenyl)-3-aryl-propylene diether of claim 1 with an ethylenically unsaturated compound polymerizable across the double bond.

4. A 2-hydroxy-1-(p-vinylphenyl)-3-aryl-propylene diether of claim 1 having the formula:

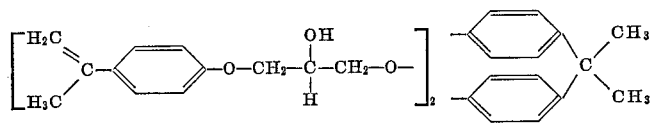

5. A copolymerizate of the 2-hydroxy-1-(p-vinylphenyl)-3-aryl-propylene diether of claim 2 having the formula

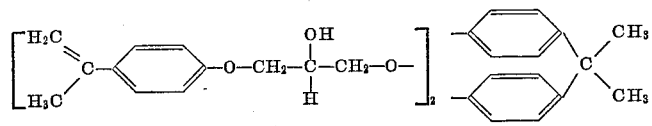

with styrene.

6. A 2-hydroxy-1-(p-vinylphenyl)-3-aryl-propylene diether of claim 1 having the formula

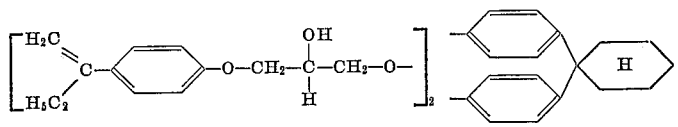

7. A copolymerizate of the 2-hydroxy-1-(p-vinylphenyl)-3-aryl-propylene diether of claim 2 having the formula

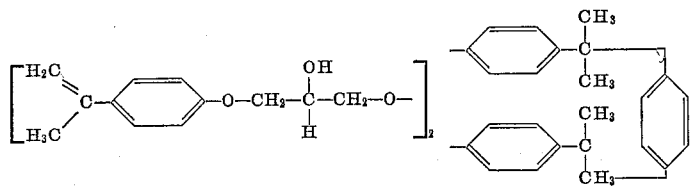

with styrene.

8. A 2-hydroxy-1-(p-vinylphenyl)-3-aryl-propylene diether of claim 1 having the formula

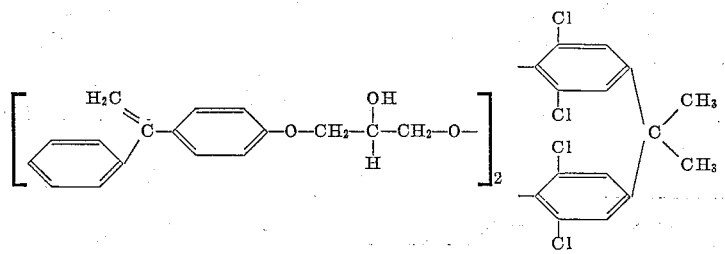

9. A copolymerizate of the 2-hydroxy-1-(p-vinylphenyl)-3-aryl-propylene diether of claim 2 having the formula

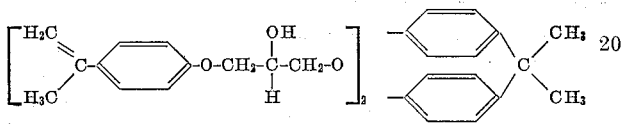

with a solution of a maleic acid unsaturated polyester in styrene.

References Cited

UNITED STATES PATENTS

| | | | |
|---|---|---|---|
| 2,970,984 | 2/1961 | D'Alelio | 260—47 |
| 3,069,534 | 12/1962 | Spence | 260—47 |
| 3,244,754 | 4/1966 | Bruson | 260—613 |

JOSEPH L. SCHOFER, *Primary Examiner.*

M. B. KURTZMAN, *Assistant Examiner.*